June 3, 1958
A. S. HENDERSON ET AL
2,837,147
SEMI-AUTOMATIC TIRE BEAD BREAKING MACHINE
Filed Feb. 4, 1954
3 Sheets-Sheet 1
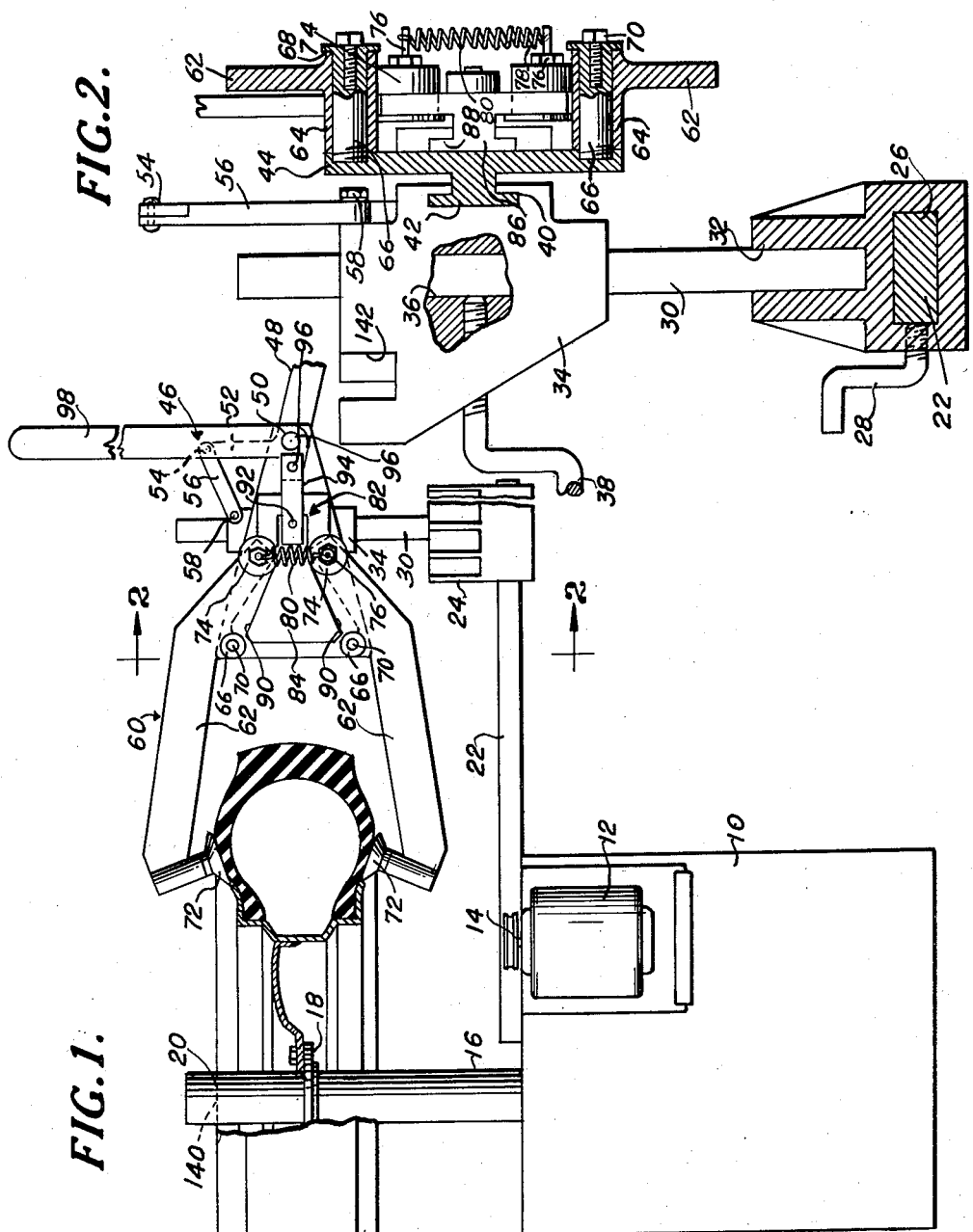
INVENTORS
ALBERT STUART HENDERSON &
WALTER L. MILLER
BY Cushman, Darby & Cushman
ATTORNEYS

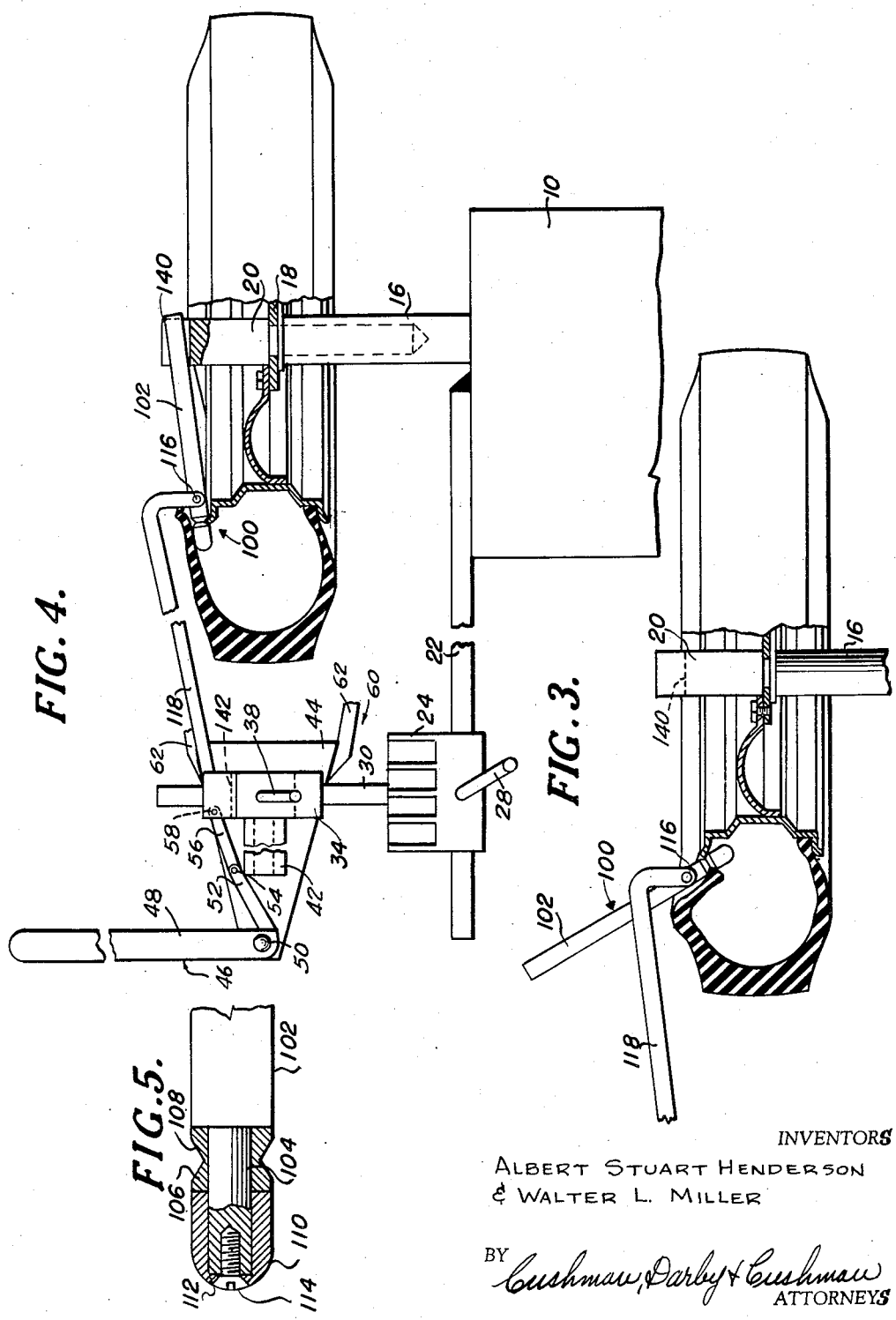

June 3, 1958 A. S. HENDERSON ET AL 2,837,147
SEMI-AUTOMATIC TIRE BEAD BREAKING MACHINE
Filed Feb. 4, 1954 3 Sheets-Sheet 3

INVENTORS
ALBERT STUART HENDERSON &
WALTER L. MILLER

BY *Cushman, Darby & Cushman*
ATTORNEYS

United States Patent Office 2,837,147
Patented June 3, 1958

2,837,147

SEMI-AUTOMATIC TIRE BEAD BREAKING MACHINE

Albert Stuart Henderson, Zion, and Walter L. Miller, Henderson, Ky.

Application February 4, 1954, Serial No. 408,161

3 Claims. (Cl. 157—1.28)

This invention relates to a machine for changing tires and, more particularly, to a semi-automatic tire changer utilizing a motor to perform a large portion of the work required.

It is well known that in order to change a tire it is necessary to perform three basic functions on the tire, each of which requires considerable manual labor on the part of the person changing the tire. It should be noted that the term "tire changing" as herein used is not restricted to replacing one tire with another but includes any manipulation of a tire wherein one or more of the three basic functional manipulations are performed. The three basic functional manipulations are: first, the beads of the tire must be broken away from the tire rim; second, the beads of the tire must be removed from the tire rim; and, third, the beads of the tire must be replaced back on the tire rim.

Heretofore it has been customary to perform these three basic functional manipulations manually by the use of hand tools. In utilizing such tools to manually change a tire a great deal of strenuous manual labor must be expended which in certain of the operations requires the exercise of considerable strength. The hand tools utilized are generally employed either to pry off or pound on the tire and consequently during such prying or pounding action permanent damage is occasionally inflicted upon the tire. The purpose of the present invention is to largely overcome the difficulties experienced in manual tire changing by providing a semi-automatic machine which will change a tire in a shorter period of time, with less manual labor by means safer for the tire.

It is therefore the primary object of the present invention to provide a machine capable of performing the three above-mentioned functional manipulations with maximum speed and safety to the tire and a minimum of manual labor on the part of the operator.

A further object of the invention is the provision of a tire changing machine in which it is only necessary for the operator to position different tools carried by the machine into an operating position and actuate power means to carry out the functional manipulations required to change the tire.

Still another object of the invention is to provide a tire changing machine which minimizes the danger of injuring the tire and inner tube being replaced.

A further object of the invention is the provision of a semi-automatic tire changing machine in which successive novel tools for performing the three above-mentioned functional manipulations are provided.

These and other objects of the present invention will become more apparent during the course of the following detailed description and appended claims.

The invention may best be understood when taken in conjunction with the accompanying drawings wherein one illustrative embodiment is shown.

In the drawings:

Figure 1 is a side elevational view of the tire changing machine of the present invention showing the bead breaking tool in its operative position;

Figure 2 is a cross sectional view taken along the line 2—2 of Figure 1;

Figure 3 is a partial side elevational view showing the manner in which the bead removing tool is initially inserted between the tire bead and the tire rim;

Figure 4 is a view similar to Figure 1, showing the tire bead removing tool in operative position;

Figure 5 is a detailed view showing the tire bead removing tool rollers in cross section;

Figure 6:
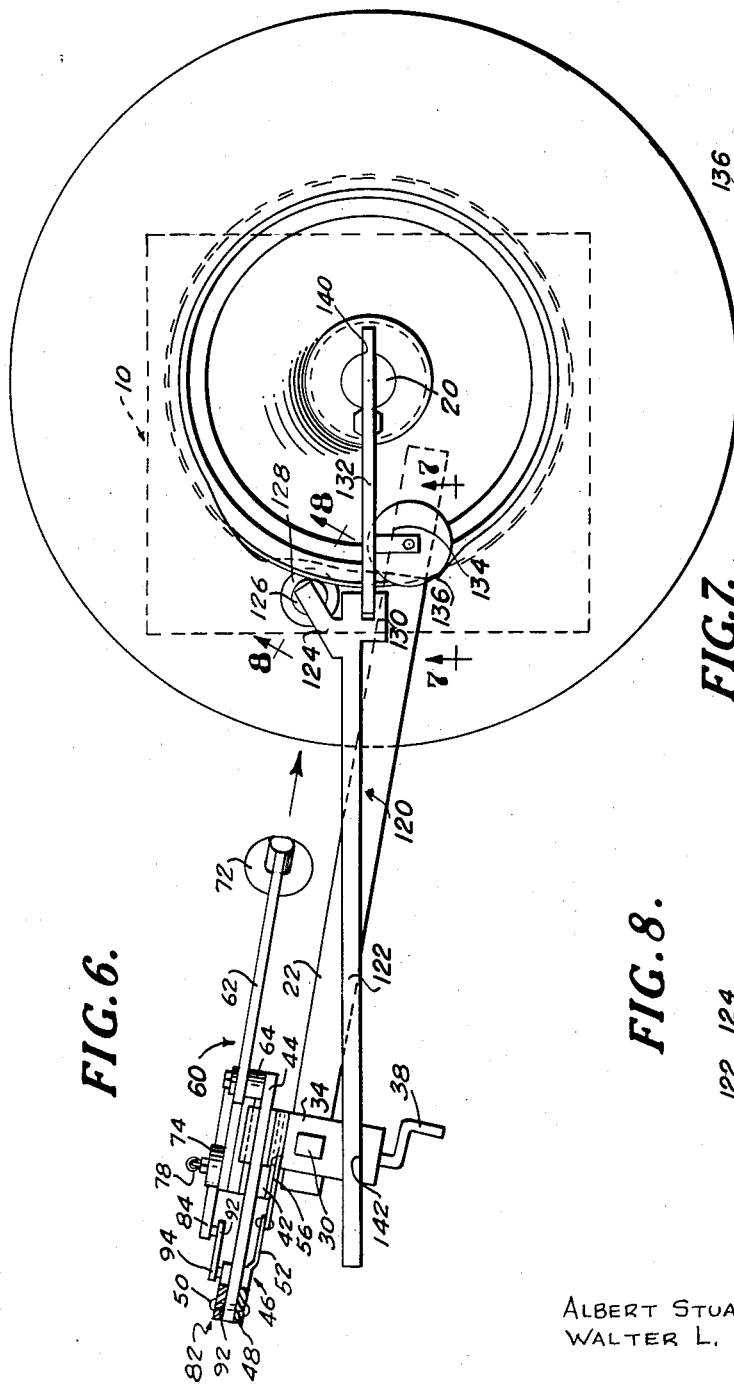
Figure 6 is a top plan view showing the tire bead replacing tool in its operative position.

Referring now to the drawings, 10 designates a support which is adapted to carry the machine of the present invention. The support 10 may be of any suitable construction and, as illustrated, comprises a box-like frame which has mounted thereon a motor 12. As illustrated in the drawings, the motor 12 is electrical, however, it will be understood that other types of prime movers may be utilized. The motor 12 includes the usual drive shaft 14 which is connected through a suitable power transmission means (not shown), such as a gear box mounted within the support 10, to a main vertical shaft 16, which extends upwardly through the support 10.

The shaft 16 is provided at its upper end with a circular flange 18, which serves as a means for fixedly connecting a tire rim concentrically on the shaft 16. As best seen in Figure 4, the upper portion of the shaft 16 is hollow to freely receive and rotatably support a slotted member 20 for a purpose hereinafter to be described.

Rigidly secured to the supoprt 10 is a horizontal bar 22, which extends outwardly from the support generally radially of the shaft 16. A horizontal sliding member 24 is provided with an aperture 26, which is adapted to receive the bar 22. A suitable set screw 28 is threadedly engaged in the member 24 and may be tightened against the bar to fixedly position the member 24 in any horizontal adjusted position along the bar 22.

Extending upwardly from the horizontal sliding member 24 is an upright bar 30 fixed at its lower end in a slot 32 in the member 24. A vertical sliding member 34, similar to the horizontal sliding member 24, is provided with a vertically extending aperture 36, which is adapted to receive the bar 30. Set screw 38 is threadably engaged in the member 34 and may be tightened against the bar 30 to secure the member 34 in any vertical adjusted position along the bar 30.

Extending from one side of the member 34 is a T-shaped slot 40 which is adapted to slidably receive a T-member 42 mounted on one side of a vertically disposed plate 44. The plate 44 is of general triangular construction, as best shown in Figure 4, and through the T-member 42 and T-slot 40 is adapted to slide horizontally toward and away from the shaft 16. A means generally designated 46 is utilized to accomplish this horizontal sliding movement. The preferred embodiment of the means 46 shown in the drawings comprises a lever 48 pivoted as at 50 to the apex of the plate 44. The lever has rigidly fixed therewith a crank arm 52 the outer end of which is pivoted as at 54 to one end of a link 56. The other end of the link 56 is pivoted as at 58 to the upper portion of the sliding member 34.

The plate 44 is adapted to carry a tire bead breaking tool generally designated by the numeral 60. The tire bead breaking tool 60 comprises a pair of spaced opposed arms 62 having cylindrical bosses 64 mounted thereon intermediate the ends thereof. The bosses 64 are mounted on pins 66 extending laterally from the plate 44 at the corners thereof. As clearly shown in Figure 2, the pins 66 are threadably engaged in the plate 44 and have washers 68 engaging bosses 64 secured to their outer ends by bolts 70. The bosses 64, pins 66, washers 68 and bolts 70 constitute a preferred means for pivoting the arms on the plate 44 and it is to be understood that other constructions may be utilized to accomplish this end.

The outer ends of the arms 62 carry opposed tire engaging rollers 72 of generally conical shape. The rollers 72, as shown, are positioned to rotate about an axis substantially 7° from the vertical. While this setting has been found to be the preferred displacement for standard automobile tires, it is to be understood that the axis of the rollers 72 may be set at any desired angle.

The other ends of the arms 62 are provided with rollers 74 rotatably mounted thereon by pivot members 76. The pivot members 76 carry pins 78 which are adapted to carry a coil spring 80. As can be clearly seen from Figure 1, the coil spring 80 normally urges the rollers 72 on the outer ends of the arms 62 away from each other.

A means generally designated 82 is provided to move the rollers 72 toward each other to perform the function of breaking the beads of a tire. The means 82 comprises a wedge-shaped element 84 having a T member 86 extending laterally from one side thereof. The T member 86 is adapted to slide in a T slot 88 provided on the face of the plate 44 opposite to and parallel with the T member 42 on the plate. The wedge element 84 includes oppositely directed wedge surfaces 90 which are adapted to contact the rollers 74 rotatably mounted on the ends of the arms 62. Pivoted to the wedge element 84 remote from wedge surfaces 90 as at 92 is one end of a link 94, the other end of which is pivotally connected as at 96 to one end of a bell crank lever 98. The bell crank lever 98 is pivoted intermediate its ends to the plate 44 at its apex and, as shown, on the same pivot 50 as lever 48. It can be seen that clockwise movement of the lever 98, as viewed in Figure 1, will through the link 94 cause the wedge element 84 to move horizontally toward the right, which will cause the rollers 74 by their engagement with the wedge surfaces 90 to move away from each other against the action of coil spring 80 thereby pivoting arms 62 on pins 66 and, hence the rollers 72 carried by the outer ends of the arms 62 will be caused to move toward each other, thereby breaking the tire beads from the tire rim.

In Figures 3, 4 and 5, there is shown a tire bead removing tool generally designated 100. The tire bead removing tool 100 comprises an arm 102 having a pin 104 extending from one end thereof. Rotatably mounted on the pin 104 is a tire rim engaging roller 106 which has an annular groove 108 which in operative position is adapted to roll on the tire rim edge. Rotatably mounted adjacent the roller 106 on the pin 104 is a tire engaging roller 110 which is provided with a rounded end 112 so as to prevent any damaging of the tire. The rollers 106 and 110 are rotatably held on the pin 104 by a suitable bolt 114 as can be clearly seen from Figure 5. Pivoted intermediate the ends of the arm 102 as at 116 is one end of a bent brace arm 118 for a purpose hereinafter to be explained.

Figure 7:
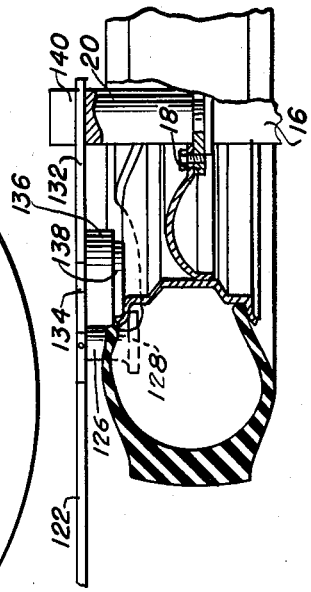
Figure 7 is a cross sectional view taken on the line 7—7 of Figure 6.
Figure 8:
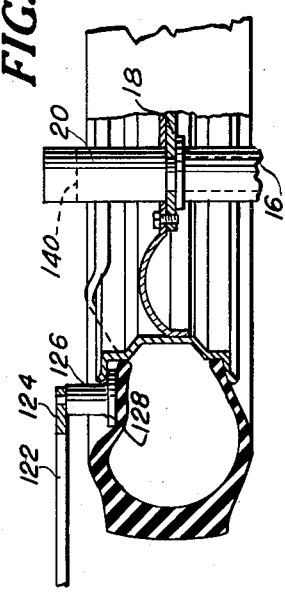
Figure 8 is a cross sectional view taken on the line 8—8 of Figure 6.

In Figures 6, 7 and 8 there is shown a tire bead replacing tool generally designated 120. The tire bead replacing tool 120 comprises an elongated arm 122, one end of which has mounted thereon an angular roller carrying arm 124. The arm 124 has rotatably mounted thereon a roller 126, the remote end of which is provided with an annular flange 128, adapted to engage the tire rim. Pivoted to the arm 122 on a forked portion 130 rigidly fixed on the end of the arm 122 adjacent roller 126 is a second arm 132 which extends generally parallel with the arm 122. Rotatably mounted on a bracket 134 secured to the arm 132 intermediate its ends is a tire bead engaging roller 136, the outer periphery of which is disposed in leading relation to the roller 126 and which is adapted to feed the tire bead into the roller 126. The roller 136 is preferably provided with an annular recessed portion 138, the periphery of which rides on the tire rim edge when the tool 120 is in its operative position.

*Operation*

In operation a tire rim carrying a tire is placed on the shaft 16 and the slotted member 20 is inserted through the tire rim into the hollow end of the shaft 16 to center the tire rim on the shaft. The tire rim is then secured by suitable bolts to the flange 18. Next, the slide members 24 and 34 are positioned along the members 22 and 30, respectively, and secured by set screws 28 and 38 in a proper adjusted position relative to the particular size of tire being changed. The lever 48 is then moved clockwise, as shown in Figure 1, and through the crank arm 52 and link 56, the plate member 44 together with the bead breaking tool 60 is moved into position where the rollers 72 are disposed adjacent the side walls of the tire. The motor 12 is then actuated causing the shaft 16 together with the tire and rim to rotate. The lever 98 is then moved clockwise, as viewed in Figure 1, which through the link 94, wedge member 84, rollers 74 and pivot pins 66 move the rollers 72 of the arm 62 toward each other into engagement with the sidewalls of the tire causing the beads of the tire to be inwardly displaced or broken from the tire rim. The co-operation of the bead breaking tool with the power rotation of the tire accomplishes the breaking of both beads of the tire in less than two revolutions of the tire, the total time to complete the operation being approximately twenty-two seconds. The device thus provides a fast, safe and easy means for breaking the tire beads.

The tire is then ready to have the beads removed from the rim and for this functional manipulation the tire removing tool 100 is used. In utilizing the tire bead removing tool 100 the rollered end of the arm 100 is first inserted between the tire rim and the broken tire bead substantially, as shown in Figure 3, and the arm 102 is then pushed forwardly by the operator until the end of the arm 102 is engaged in a slot 140 in the upper end of the slotted member 20. When the arm 102 has reached this position the annular groove 108 in the roller 106 is in engagement with the edge of the tire rim and the roller 110 is in engagement with the under portion of the tire substantially, as shown in Figure 4. The pivoted brace arm 118 is then moved into a position such that the free end thereof will seat in a cradle slot 142 formed in the upper portion of the sliding member 34. The motor 12 is then actuated causing the shaft 16 together with the tire to rotate and since the tool 100 is held stationary relative to the tire by its engagement in slots 140 and 142, the rotative movement of the tire will cause the bead to be removed throughout its entire periphery. It is to be noted that the rim engaging roller 106 will roll in one direction as the rim is rotated and that the tire engaging roller 110 will rotate in the opposite direction due to its engagement with a tire. As was stated previously, the roller 110 is rounded on its end so as to prevent any damage to the tire.

It can be seen that the large portion of the manual labor required to manually remove a tire bead from the rim is thus accomplished by means of the motor 12, and it has been found in practice that the bead may be removed in less than two revolutions of the tire, which effects substantial saving in time in comparison with the manual removal of the bead. After the first bead of the tire has been removed from the rim, the above procedure may be repeated for the second bead to remove the entire tire from the rim or, since the removal of the second bead is relatively easy as compared with the first bead, the tire may be removed by simply pulling it off of the rim.

To replace the tire on the rim the tire bead replacing tool 120, illustrated in Figures 6, 7 and 8, is utilized. The tire is first placed in contact with the rim so that the lower or first bead is in contact with the upper part of the tire rim. In utilizing the tool 120 the flange 128 of the roller 126 is inserted between the first tire bead and the rim, then the arm 122 is moved downwardly by the operator until the adjacent portion of the bead is disposed inside the rim and the free end of the arm 122 seats in the cradle slot 142. The pivoted arm 132 is then moved downwardly until the roller 136 engages the edge of the tire bead and the inner end of the arm 132 seats in the slot 140. The motor 12 is then actuated causing the shaft 16 together with the tire to rotate in a clockwise direction, as viewed in Figure 6. During rotation of the tire the portion of the first tire bead above the tire rim is first engaged by the roller 136 which displaces it outwardly past the edge of the tire rim so that upon further rotation the portion of the tire bead which has engaged the roller 136 will be gradually fed under the roller 126. This procedure is repeated to replace the second or upper bead on the tire rim after the first has been replaced. The relative position of the tire with respect to the two rollers, when replacing the second bead, is shown in Figures 7 and 8. Again, the majority of the manual labor required to replace the tire bead on the tire rim is accomplished by the motor 12, and it has been found in actual practice that the tire bead may be replaced on the tire rim in less than two revolutions of the tire with the attendant saving in time required to perform the manipulative function. Again, the tool 120 may be utilized to replace both of the tire beads on the tire rim if desired or, since the first bead may be replaced manually comparatively easier than the second bead, the tool 120 may be utilized only to replace the second tire bead on the tire rim.

The purpose of providing each of the successive tools employed with rollers at the point of contact of the tool with the tire is so that the relative movement between the tire and the tool will be substantially frictionless. This relationship is essential particularly in regard to the bead removing tool and the bead replacing tool since when these tools are utilized the tire is not fixedly mounted on the rim. Stated differently, the frictional contact of the tire bead with the tire rim is greater than the frictional contact between the tire and the tool so that rotation of the tire rim upon actuation of the motor will cause the tire to be rotated with the rim rather than being held stationary by the tool while the rim rotates within the tire. It can therefore be seen that the rolling contact with the tires provided by the various tools is an essential feature of the invention; it being questionable whether a bead removing tool or a bead replacing tool having merely a sliding contact with the tire would operate to perform its intended function when the rim is power rotated.

It can be seen that there has been provided a tire changing machine which includes a motor for accomplishing a substantial part of the manipulative steps heretofore requiring manual labor. The machine is capable of performing the three basic manipulations necessary in changing a tire with a substantial saving in time over the manual labor method and is so constructed as to provide a safer means for the tire of carrying out the three basic manipulations.

It is to be understood, however, that the form of the invention herewith shown and described is to be taken as the preferred embodiment and that various changes may be made without departing from the spirit of the invention or the scope of the appended claims.

I claim:

1. A tire changing machine comprising a support, a rotatable shaft extending from said support, power means for rotating said shaft, means on said shaft for fixedly securing a tire rim concentrically thereon, a member mounted on said support for sliding adjustment toward and away from said shaft, a plate slidably mounted in said member for movement toward and away from said shaft, means for sliding said plate in said member, a pair of spaced opposed arms pivoted intermediate their ends to said plate, an end of each of said arms extending beyond said plate toward said shaft, means on said ends for engaging opposite side walls of a beaded tire carried by said tire rim, roller means on the opposite ends of said arms, a wedge-shaped element disposed between said rollers and slidably mounted on said plate, means for biasing said rollers into engagement with said wedge-shaped element and means for sliding said wedge-shaped element relative to said plate whereby said arms are caused to pivot and the first-mentioned ends are caused to move toward each other.

2. A tire changing machine comprising a support, a rotatable shaft extending from said support, power means for rotating said shaft, means on said shaft for fixedly securing a tire rim concentrically thereon and a tire bead breaking tool mounted on said support for movement toward and away from said shaft, said tire bead breaking tool comprising a supporting plate, a pair of spaced opposed arms pivoted to said plate, an end of each of said arms extending beyond said plate toward said shaft, means on said ends for engaging opposite side walls of a beaded tire carried by said tire rim, an element slidably mounted on said plate having means in engagement with said arms for effecting pivotal movement of the latter in response to sliding movement of said element, and means connected with said element for slidably moving the latter whereby movement of said element causes said arms to pivot and move said ends toward and away from each other.

3. For use with a tire changing machine having a support, a rotatable shaft extending from said support, means for rotating said shaft and means on said shaft for securing a tire rim concentrically thereon; a tire bead breaking tool comprising a supporting member, a plate mounted on said supporting member for movement toward and away from said shaft, a pair of spaced opposed arms pivoted to said plate, an end of each of said arms extending beyond said plate toward said shaft, means on said ends for engaging opposite sidewalls of a beaded tire carried by said tire rim, an element slidably mounted on said plate having means in engagement with said arms for effecting pivotal movement of the latter in response to sliding movement of said element, and means connected with said element for slidably moving the latter whereby movement of said element causes said arms to pivot and move said ends toward and away from each other.

References Cited in the file of this patent

UNITED STATES PATENTS

| Number | Name | Date |
| --- | --- | --- |
| 959,669 | Wiest | May 31, 1910 |
| 1,060,477 | Meyers | Apr. 29, 1913 |
| 1,385,948 | Norlund | July 26, 1921 |
| 1,432,967 | Clark | Oct. 24, 1922 |
| 1,445,784 | Mayer et al. | Feb. 20, 1923 |
| 1,966,766 | Raby et al. | July 17, 1934 |
| 2,212,768 | Bonneau | Aug. 27, 1940 |
| 2,437,512 | Ekse | Mar. 9, 1948 |
| 2,471,642 | Moltz | May 31, 1949 |
| 2,482,789 | Moore | Sept. 27, 1949 |
| 2,534,950 | Butterfield et al. | Dec. 19, 1950 |
| 2,569,789 | Weaver | Oct. 2, 1951 |
| 2,581,569 | Zugaro et al. | Jan. 8, 1952 |